United States Patent [19]

Matsushima et al.

[11] Patent Number: 5,316,125
[45] Date of Patent: May 31, 1994

[54] ASSEMBLY LINE STRUCTURE

[75] Inventors: Hidetoshi Matsushima; Yoshinori Noguchi; Shizuo Ishijima, all of Kawasaki, Japan

[73] Assignee: Fujitsu Limited, Kawasaki, Japan

[21] Appl. No.: 862,576
[22] PCT Filed: Oct. 29, 1991
[86] PCT No.: PCT/JP91/01470
§ 371 Date: Jun. 24, 1992
§ 102(e) Date: Jun. 24, 1992
[87] PCT Pub. No.: WO92/07683
PCT Pub. Date: May 14, 1992

[30] Foreign Application Priority Data

Nov. 6, 1990 [JP] Japan ............... 2-300150

[51] Int. Cl.⁵ .............................. B65G 21/06
[52] U.S. Cl. ................... 198/465.2; 198/583
[58] Field of Search .......... 198/465.1, 465.2, 465.3, 198/583, 594; 29/33 P

[56] References Cited

U.S. PATENT DOCUMENTS

| | | | |
|---|---|---|---|
| 4,359,149 | 11/1982 | Erlichman et al. | 198/465.2 X |
| 4,515,264 | 5/1985 | Sticht | 198/465.2 X |
| 4,762,218 | 8/1988 | Sticht | 198/465.2 X |
| 4,783,904 | 11/1988 | Kimura | 198/465.2 X |
| 4,787,496 | 11/1988 | Prodel et al. | 198/465.2 X |
| 5,012,917 | 5/1991 | Gilbert et al. | 198/465.2 |
| 5,103,964 | 4/1992 | Sticht | 198/465.2 |
| 5,205,026 | 4/1993 | Sticht | 198/465.2 X |

FOREIGN PATENT DOCUMENTS

| | | |
|---|---|---|
| 49778 | 5/1975 | Japan . |
| 160032 | 9/1983 | Japan . |
| 201773 | 11/1984 | Japan . |
| 84842 | 4/1988 | Japan . |
| 2118127 | 10/1983 | United Kingdom ............ 198/465.2 |

*Primary Examiner*—D. Glenn Dayoan

[57] ABSTRACT

An assembly line for assembling a product by a series of operations comprises a conveyer body assembly which includes a plurality of conveyer body units. Each unit has an assembly area for carrying out a predetermined process for producing a product to be assembled and forms a minimal unit which takes charge of a part of the series of operations. The conveyer body assembly is formed by connecting an arbitrary number of conveyer body units greater than or equal to two, which makes it possible to cope with any change in the production plan or the like with a high flexibility.

5 Claims, 9 Drawing Sheets

ASSEMBLY LINE STRUCTURE

FIELD OF THE INVENTION

The present invention generally relates to assembly line structures, and more particularly to an assembly line structure which can cope with a change or modification in the production plan and the like with a high flexibility.

BACKGROUND OF THE INVENTION

The workload and the number of processes required to assemble a product differ depending on the product. For this reason, it is desirable that the assembly line has a structure such that the assembly operation can easily be changed.

Figure 1:
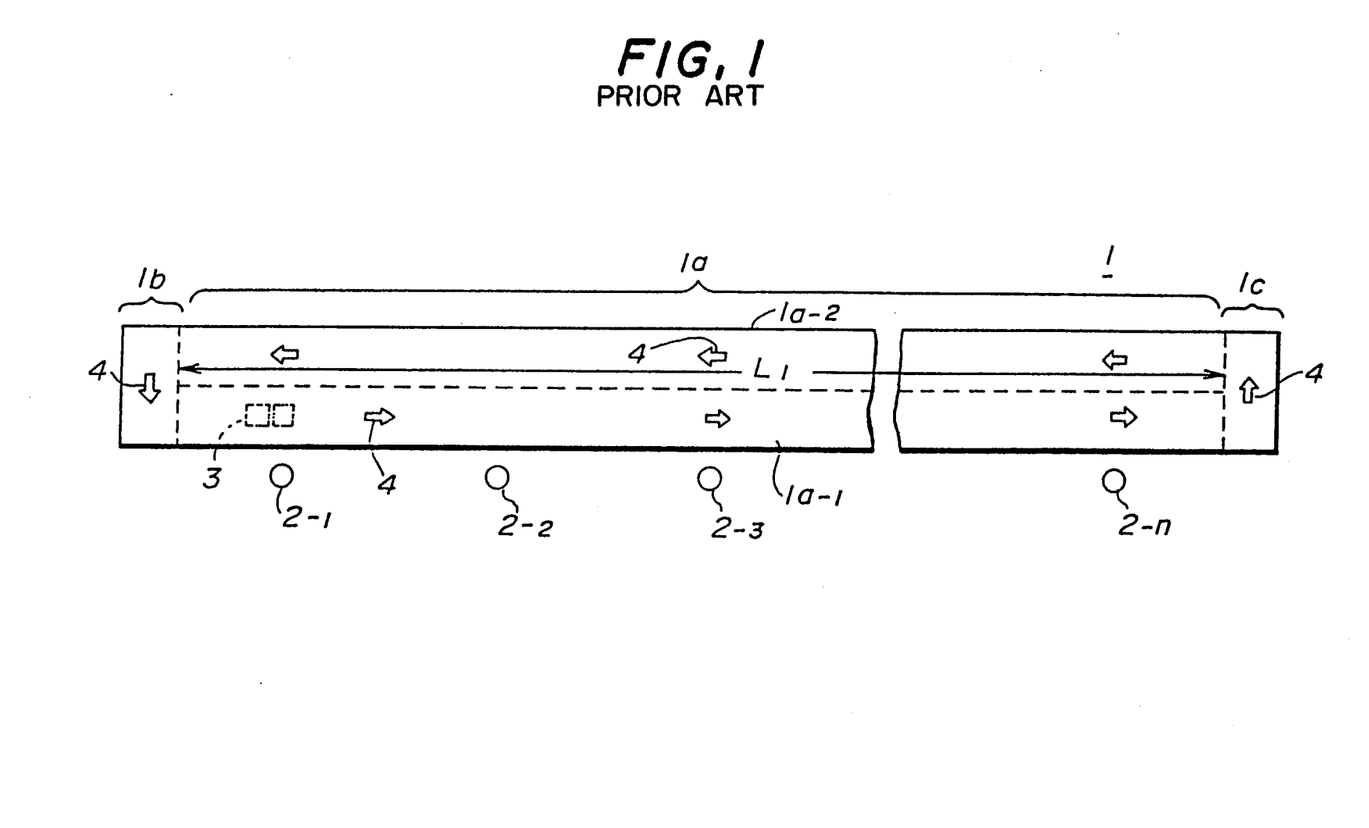
FIG. 1 is a diagram showing an embodiment of a conventional assembly line.

FIG. 1 shows an example of a conventional line. In FIG. 1, an assembly line 1 includes a conveyer body part 1a having a total length $L_1$ which is set to a length corresponding to the operation order which is initially planned for the product to be assembled, and traverse parts 1b and 1c which are integrally formed on a starting end and a finishing end of this conveyer body part 1a. An assembly area part 1a-1 and a pallet return conveyer part 1a-2 are arranged in parallel in the conveyer body part 1a. 2-1 through 2-n denote operators, and a pallet 3 which is an assembly jig is transported as indicated by an arrow 4.

There are cases where the product being assembled is changed due to a change in the production plan or the like. In such cases, no particular problem occurs if the number of processes required to assemble the new product is smaller than the number of processes required to assemble the product of the initial production plan. However, if the number of the processes is greater, there is a problem in that the existing assembly line 1 cannot be used.

SUMMARY OF THE INVENTION

Accordingly, it is a general object of the present invention to provide a novel and useful assembly line structure in which the problem described above is eliminated.

This and other objects of the present invention are attained by an assembly line for assembling a product by a series of operations, comprising a conveyer body unit which has at least an assembly area for carrying out a predetermined process with respect to the product to be assembled and forms a minimum unit which takes charge of a part of the series of operations, and a conveyer body assembly which is formed by connecting an arbitrary number of conveyer body units greater than or equal to two.

According to the present invention, the length of the assembly line can be changed arbitrarily because the conveyer body assembly is formed by the conveyer body units, and it is possible to cope with the change in the number of processes, the change in the product to be assembled and the like with a high flexibility. In addition, the cost of equipment can be reduced because it copes with the change in the production plan or the like by appropriately changing the existing assembly line, without having to set up a new assembly line from the beginning.

Other objects and further features of the present invention will be apparent from the following detailed description when read in conjunction with the accompanying drawings.

DETAILED DESCRIPTION OF THE PREFERRED EMBODIMENTS

Figure 2:
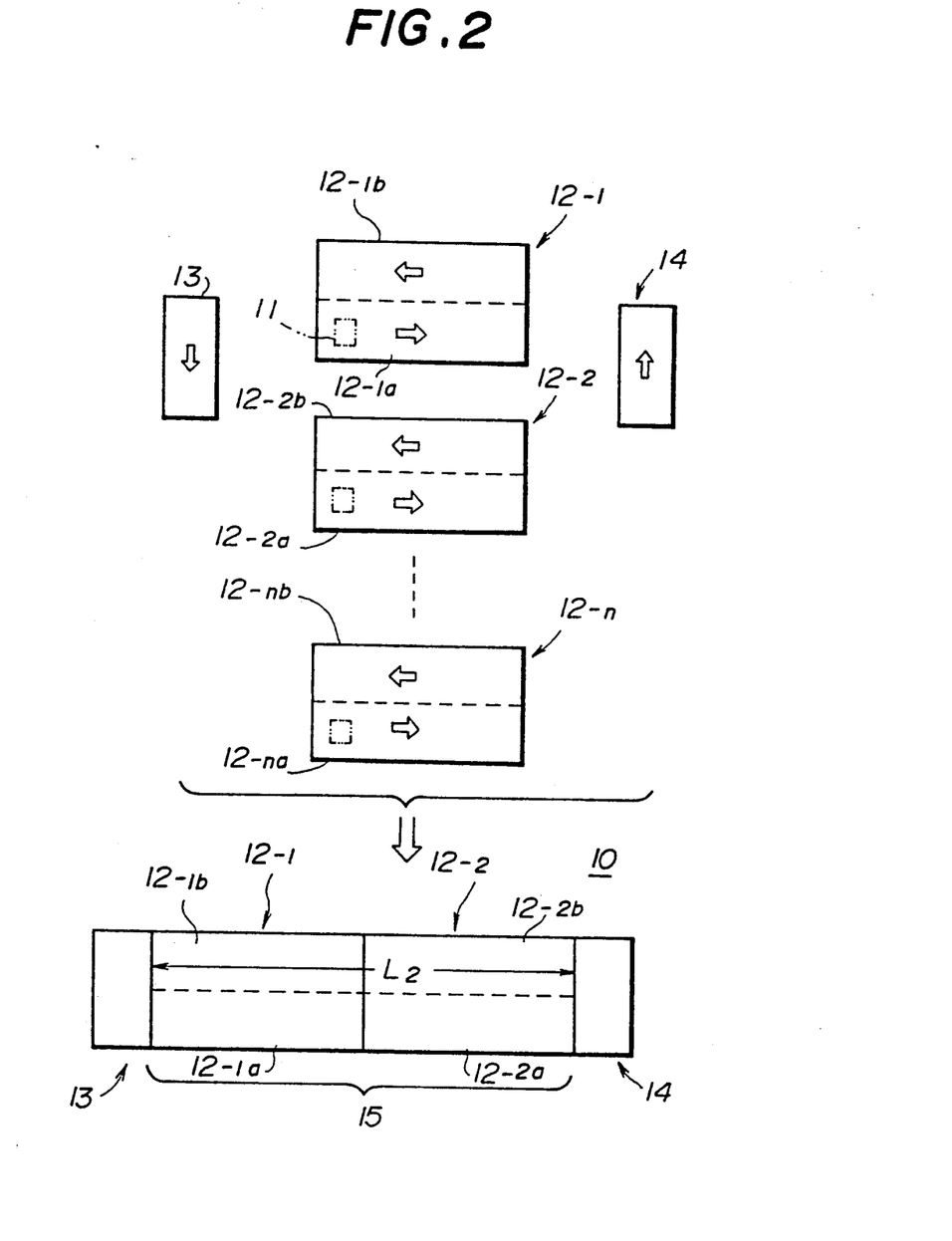
FIG. 2 is a diagram illustrating the principle of a present invention.

First, the principle of the present invention will be described in conjunction with FIG. 2. In FIG. 2, any conveyer body unit 12-i of units 21-1 to 12-n includes an assembly area part 12-ia on which an assembly jig 11 is transported, and an assembly jig return conveyer part 12-ib which is arranged in parallel to and in correspondence with the assembly area part 12-ia (where i=1, 2, ..., n). A starting end traverse unit 13 is a independent from the conveyer body unit 12-i and transports the assembly jig 11 from the assembly jig return conveyer part 12-ib to the assembly area part 12-ia. A finishing end traverse unit 14 is a body independent from the conveyer body unit 12-i and transports the assembly jig 11 from the assembly area part 12-ia to the assembly jig return conveyer part 12-ib.

An assembly line structure 10 is formed by arranging in line and connecting a plurality of conveyer body units 12-1 through 12-n in an arbitrary number greater than or equal to two depending on the number of operation processes for assembling the product, and by respectively connecting the starting end traverse unit 13 and the finishing end traverse unit 14 at the starting end and the finishing end of the arbitrary number of conveyer body units which are connected. FIG. 2 shows a case where two conveyer body units 12-1 and 12-2 are connected to form a conveyer body assembly 15, and the conveyer body assembly 15 in this case has a length $L_2$. However, the length of the conveyer body assembly 15 may be changed freely depending on the number of conveyer body units used.

In the present specification, a "conveyer body unit" represents a minimal unit which is in charge of a part of the series of operations to be realized by the assembly line structure. Accordingly, the operation to be carried out by one conveyer body unit may be related to one or a plurality of processes or, related to a part of one or a plurality of processes. In addition, the number of operators who carry out the operation at one conveyer body unit may be one or more.

Figure 3:
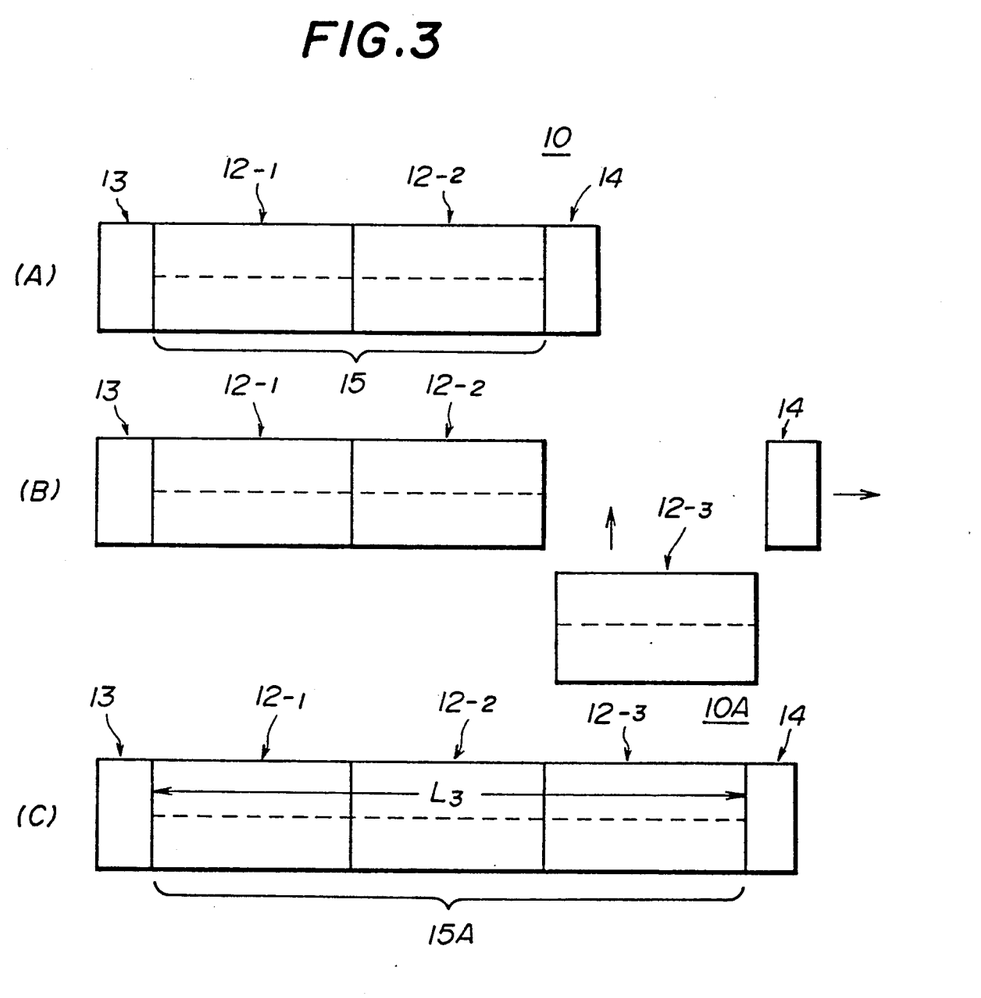
FIG. 3 is a diagram for explaining the change in an assembly line structure.

A description will be given of an example of a case where the length $L_2$ of the conveyer body assembly 15 is changed to $L_3$, by referring to FIG. 3. The finishing end traverse unit 14 is removed, and one conveyer body unit 12-3 is connected to one conveyer body unit 12-2 at the finishing end of the existing conveyer body assembly 15, in line with the conveyer body assembly 15, so as to form a conveyer body assembly 15A which has the length $L_3$ which is increased by the length of one conveyer body unit 12-3. Thereafter, as shown in (C) of FIG. 3, the finishing end traverse unit 14 is set up and connected to the finishing end of the conveyer body assembly 15A, so as to form an assembly line structure 10A.

Figure 4:
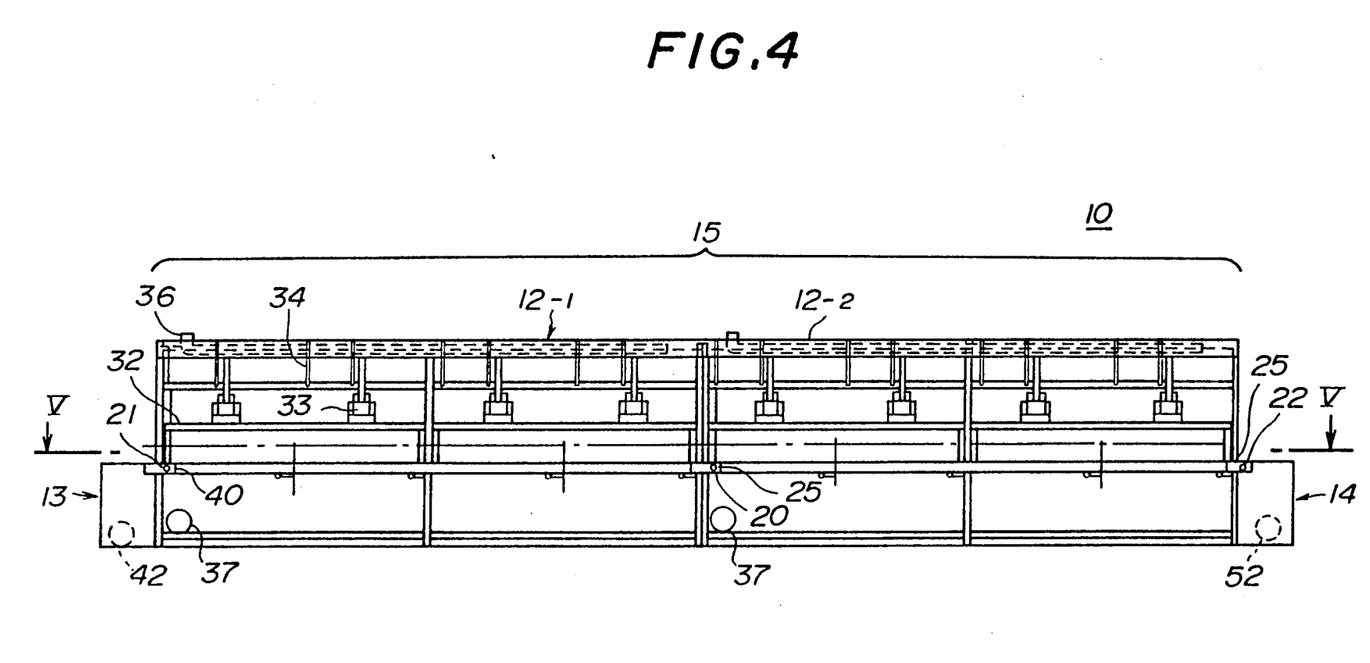
FIG. 4 is a front view showing an embodiment of the assembly line structure according to the present invention.
Figure 5:
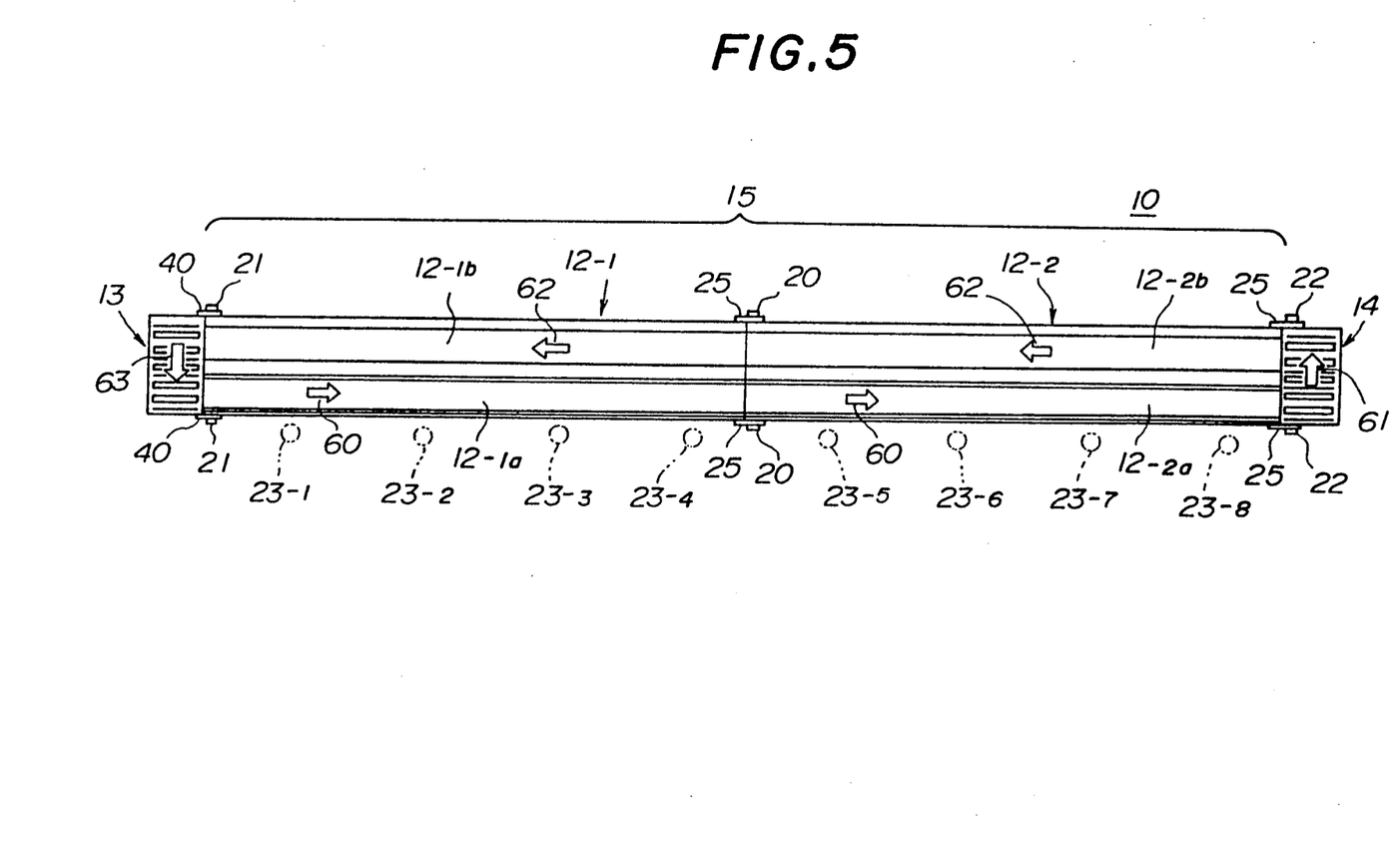
FIG. 5 is a cross sectional view along a line V—V in FIG. 4.
Figure 6:
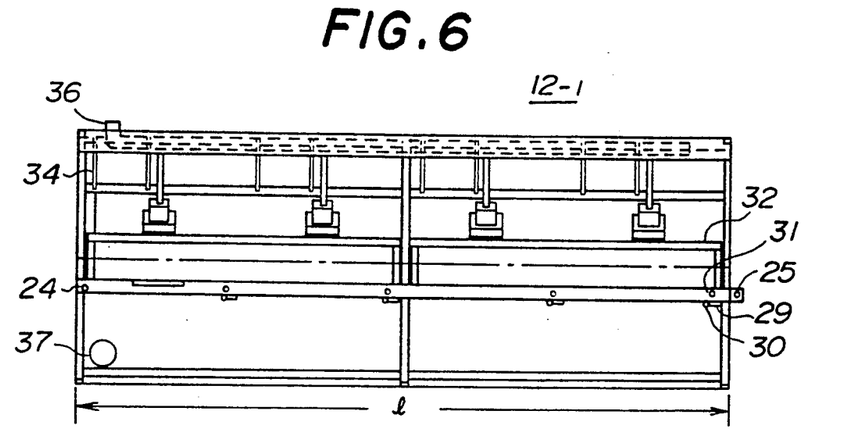
FIG. 6 is a front view of one conveyer body unit in FIG. 4.
Figure 7:
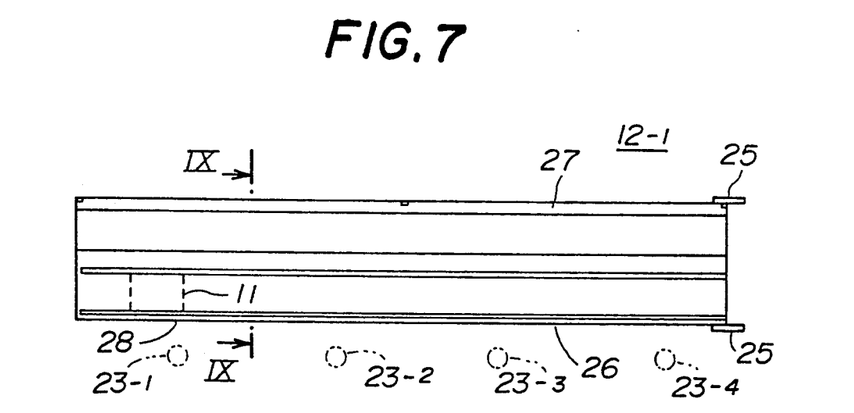
FIG. 7 is a diagram showing a transport surface of one conveyer body unit of FIG. 6.
Figure 8:
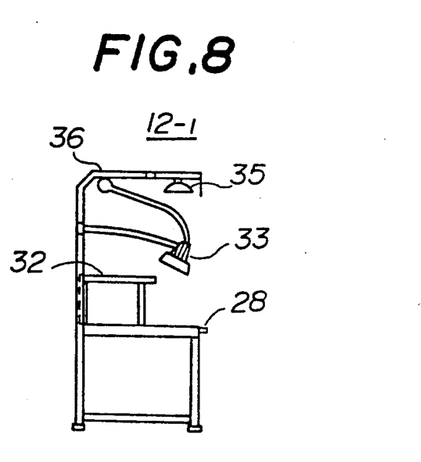
FIG. 8 is a left side view showing one conveyer body unit of FIG. 6.
Figure 9:
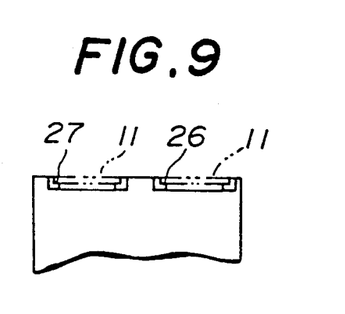
FIG. 9 is a partial enlarged cross sectional view along a line IX—IX in FIG. 7.

Next, a description will be given of an embodiment of the assembly line structure according to the present invention, by referring to FIGS. 4 and 5. In FIGS. 4 and 5, those parts which are the same as those corresponding parts in FIGS. 2 and 3 are designated by the same reference numerals, and a description thereof will be omitted.

In the assembly line 10, the conveyer body unit 12-1 and the conveyer body unit 12-2 are connected to each other by a bolt 20 in a linearly arranged state to form the conveyer body assembly 15. The starting end traverse unit 13 is fixed to the starting end of this conveyer body assembly 15 by a bolt 21, and the finishing end traverse unit 14 is fixed to the finishing end of the conveyer body assembly 15 by a bolt 22.

The conveyer body unit 12-1 has a structure shown in FIGS. 6 through 9. The conveyer body unit 12-2 has the same structure as the conveyer body unit 12-1, and an illustration and description thereof will be omitted.

As shown in FIG. 6–9, the conveyer body unit 12-1 has a length l such that four operators 23-1 through 23-4 can carry out the operations. This length l may be reduced so that only two operators carry out the operations at the conveyer body unit 12-1. For example, one operator is in charge of the operation related to one process.

A screw hole 24 for connection is provided at one end of the conveyer body unit 12-1, and a metal fitting 25 for connection is provided at the other end.

A rail 26 for manual feeding is provided at the assembly area part 12-1a, and a free flow conveyer 27 is provided at the assembly jig return conveyer part 12-1b. A motor 37 which drives the free flow conveyer 27 is mounted within the conveyer body unit 12-1.

Reference numeral 28 represents an assembly jig fixing stopper, 29 represents a power source outlet, 30 represents a pressure coupler, 31 represents a wrist strap connector for the operator, 32 represents an auxiliary shelf, 33 denotes an exhaust fan, 34 represents a board for holding drawings, 35 denotes a fluorescent lamp, and 36 represents a main exhaust duct.

Figure 10:
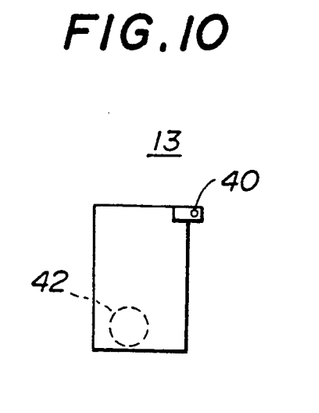
FIG. 10 is a front view of a starting end traverse unit of the assembly line of FIG. 4.
Figure 11:
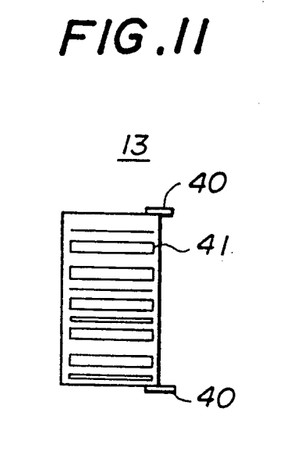
FIG. 11 is a plan view of the unit shown in FIG. 10.
Figure 12:
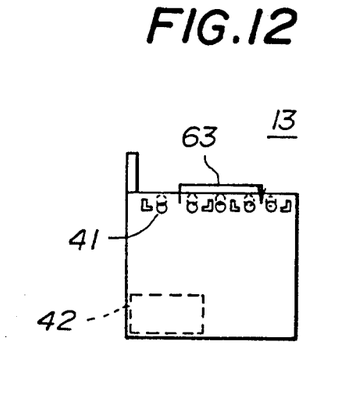
FIG. 12 is a left side view of the unit shown in FIG. 10.

FIGS. 10 through 12 show the starting end traverse unit 13 shown in FIG. 4.

This traverse unit 13 is a body independent from the conveyer body unit 12-1 and is mounted with a connecting metal fitting 40. In addition, a conveyer 41 with an elevator mechanism and a motor 42 for driving this conveyer 41 are assembled in the traverse unit 13.

Figure 13:
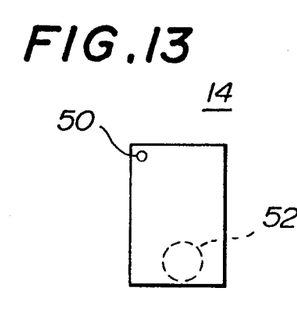
FIG. 13 is a front view showing a finishing end traverse unit of the assembly line of FIG. 4.
Figure 14:
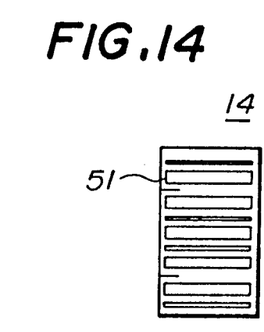
FIG. 14 is a plan view of the unit shown in FIG. 13.
Figure 15:
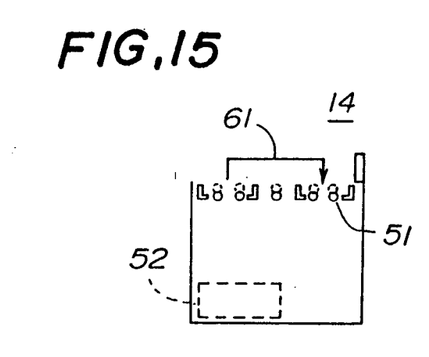
FIG. 15 is a right side view of the unit shown in FIG. 13.

FIGS. 13 through 15 show the finishing end traverse unit 24 shown in FIG. 4.

This traverse unit 14 is a body independent from the conveyer body unit 12-1 and is provided with a connecting screw hole 50. In addition, a conveyer 51 with an elevator mechanism and a motor 52 for driving this conveyer 51 are assembled in the traverse unit 14.

Returning now to FIGS. 4 and 5, the conveyer body units 12-1 and 12-2 are arranged linearly and connected by inserting the bolt 20 through the hole in the metal fitting 25 of the conveyer body unit 12-1 and the screw hole 24 in the conveyer body unit 12-2 and tightening this bolt 20. The two conveyer body units 12-1 and 12-2 which are connected in this manner form the conveyer body assembly 15.

The starting end traverse unit 13 is connected to the starting end of the conveyer body assembly 15 by the bolt 21 which fixes the connecting metal fitting 40 to the conveyer body unit 12-1 end of the conveyer body assembly 15. On the other hand, the finishing end traverse unit 14 is connected to the finishing end of the conveyer body assembly 15, that is, the conveyer body unit 12-2 end, by inserting the bolt 22 through the hole in the connecting metal fitting of the conveyer body unit 12-2 and a screw hole 50 shown in FIG. 13 and tightening this bolt 22.

Accordingly, the assembly line structure 10 which is suited for the assembling operation of the product having eight operation processes is formed.

In FIG. 5, the assembly jig 11 is successively transported on the assembly area parts 12-1a and 12-2a of the conveyer body assembly 15 to the right as indicated by arrows 60. When the assembly jig 11 reaches the finishing end of the assembly area part 12-2a, the assembly jig 11 is transported from the assembly area part 12-2a to the assembly jig return conveyer part 12-2b by the finishing end traverse unit 14 as indicated by an arrow 61 in FIG. 15, so as to traverse the conveyer body assembly 15. Next, the assembly jig 11 is successively transported on the assembly jig return conveyer parts 12-2b and 12-1b of the conveyer body assembly 15 to the left as indicated by arrows 62. When the assembly jig 11 reaches the finishing end of the assembly jig return conveyer part 12-1b, the assembly jig 11 is transported from the conveyer part 12-1b to the assembly area part 12-1a by the starting end traverse unit 13 as indicated by an arrow 63 in FIG. 5 and FIG. 12, so as to traverse the conveyer body assembly 15, and the assembly jig 11 is returned to the original position.

The part or product which is assembled in the conveyer body assembly 15 may be completed at the assembly area parts 12-1a and 12-2a or, completed after passing through the assembly area parts 12-1a and 12-2a a plurality of times. In the case where the part or product is completed after passing through the assembly area parts 12-1a and 12-2a a plurality of times, the incomplete part or product is of course transported to the assembly jig return conveyer part 12-2b by the finishing end traverse unit 14, together with the assembly jig 11, when the incompleted part or product reaches the finishing end of the assembly area part 12-2a. The completed part or product is manually moved to a predetermined rack or the like from the assembly area part 12-2a.

Next, a description will be given of the formation of the assembly line structure for the case where the product to be assembled changes, the number of operation processes increases by four, for example, and the product which requires twelve operation processes is to be assembled.

In this case, the assembly line is changed as described above in conjunction with FIG. 3. More particularly, in FIGS. 4 and 5, the bolt 22 is removed, and the finishing end traverse unit 14 is disconnected from the conveyer body assembly 15. In addition, another conveyer body unit 12-3 is connected to the conveyer assembly 15 by a bolt, and the finishing end traverse unit 14 is connected to this conveyer body unit 12-3 by a bolt.

Accordingly, the assembly line structure 10 is modified into an assembly line structure 10A which is suited for assembling the product which requires twelve operation processes.

On the other hand, if the number of operation processes decreases as a result of the change in the product to be assembled, one or a plurality of conveyer body units are removed to reduce the length of the assembly line.

Figure 16:
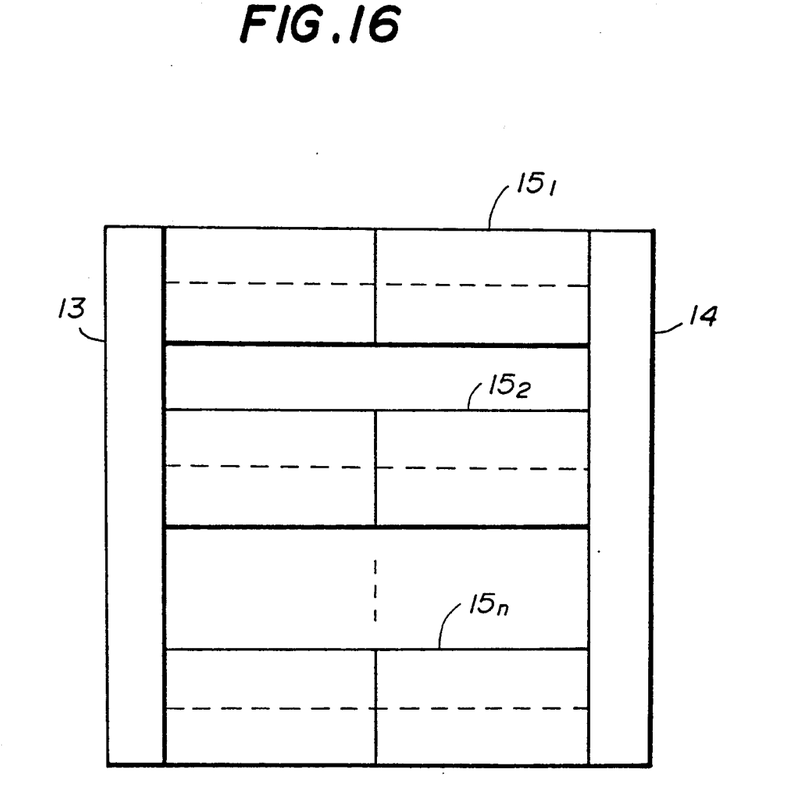
FIG. 16 is a cross sectional view showing another embodiment of the assembly line structure according to the present invention.

FIG. 16 shows another embodiment of the assembly line structure according to the present invention. In FIG. 16, those parts which are the same as those corresponding parts in FIG. 5 are designated by the same reference numerals, and a description thereof will be omitted.

In this embodiment, a plurality of conveyer body assemblies $15_1$ through $15_n$ are arranged approximately in parallel to each other and connected to the traverse units 13 and 14. The assembly line structure can be modified similarly as in the case of the above described embodiment, by inserting or removing the same number of conveyer body units in each of the conveyer body assemblies $15_1$ through $15_n$.

In each of the above embodiments, the term assembly is intended for the operations such as connecting parts, soldering and testing parts, and may be any kind of process which is carried out with respect to the part or product.

Further, the present invention is not limited to these embodiments, but various variations and modifications may be made without departing from the scope of the present invention.

As described above, according to the assembly line structure of the present invention, the length of the assembly line can be changed arbitrarily because the conveyer body assembly is formed by the conveyer body units, and it is possible to cope with the change in the number of operation processes, the change in the product to be assembled and the like with a high flexibility. In addition, the cost of equipment is low because the present invention copes with the change in the production plan or the like by appropriately changing the existing assembly line, and not by setting up a new assembly line from the beginning. Therefore, the present invention is extremely useful from the practical point of view.

We claim:

1. An assembly line for assembling a product by a series of operations, comprising:
    a conveyor body assembly including a plurality of conveyor body units in an arbitrary number greater than or equal to two and arranged in line,
    each conveyor body unit (12-1, 12-n) forming a minimal unit for carrying out a part of the series of operations and including an assembly area part (12-1a, 12-n) for carrying out a predetermined process for making a product to be assembled, said assembly area part transporting an assembly jig (11) in a predetermined direction along said line, and an assembly jig return conveyor part (12-1b,12-n) which is arranged in parallel to the assembly area part (12-1a, 12-n) and transports the assembly jig (11) used when assembling the product in a direction opposite to said predetermined direction.

2. The assembly line as claimed in claim 1, and further comprising a starting end traverse unit (13) which is independent from said conveyor body assembly and transports said assembly jig from said assembly jig return conveyor part to said assembly jig from said assembly jig return conveyor part to said assembly area part (12-1a, 12-n) of a respective conveyor body unit at a starting end of the conveyor body assembly (15), and a finishing end traverse unit (14) which is independent from said conveyor body assembly and transports said assembly jig from said assembly area part to said assembly jig return conveyor part of a respective conveyor body unit at a finishing end of the conveyor body assembly.

3. The assembly line as claimed in claim 1, wherein a length of the conveyor body assembly (15) is arbitrarily set by inserting and removing any of the conveyor body units (12-1, 12-n) from the assembly line.

4. The assembly line as claimed in claim 1, wherein said conveyor body assembly provides that said series of operations are carried out when the product passes through the conveyor body assembly (15) once.

5. The assembly line as claimed in claim 2, wherein said conveyor body assembly provides that said series of operations are carried out when the product passes through the conveyor body assembly (15) a plurality of times, and each traverse unit (13, 14) transports the assembly jig (11) together with the product to be assembled.

* * * * *